March 11, 1958 W. J. SCHWERTFEGER 2,826,024
APPARATUS FOR DIVIDING FILLED EGG FLATS
Filed Feb. 1, 1957 2 Sheets-Sheet 1
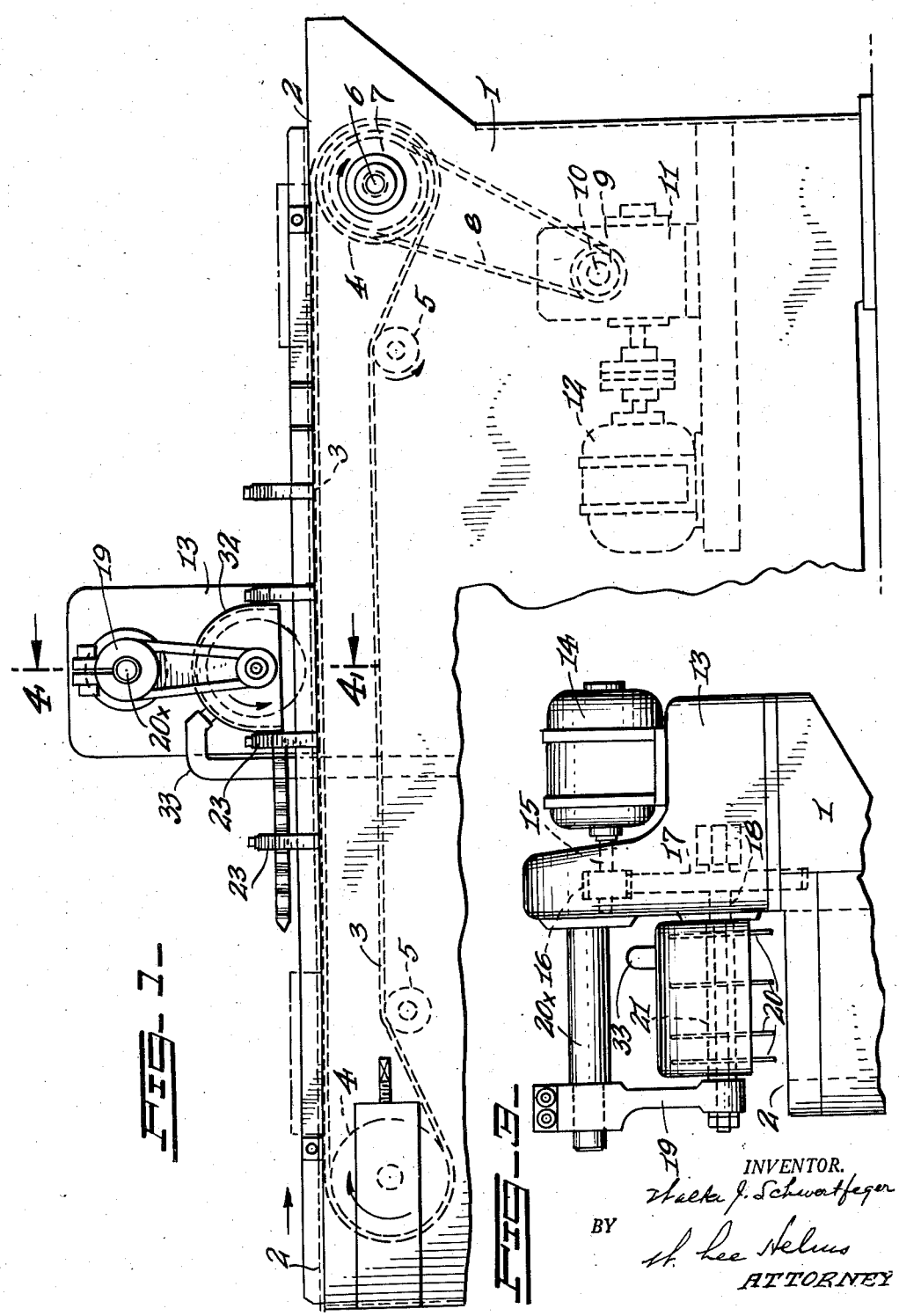

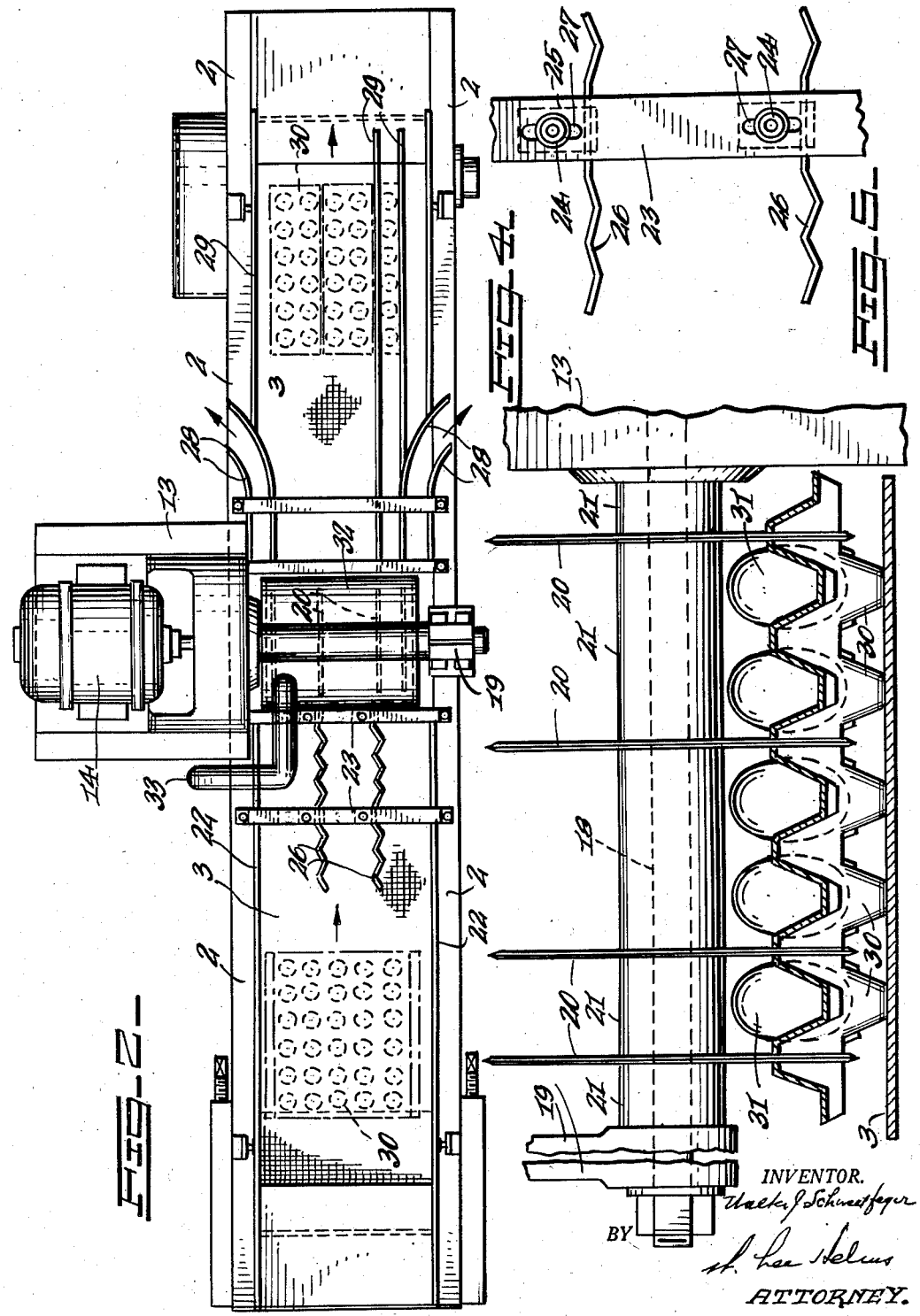

United States Patent Office 2,826,024
Patented Mar. 11, 1958

2,826,024

APPARATUS FOR DIVIDING FILLED EGG FLATS

Walter J. Schwertfeger, Englewood, N. J.

Application February 1, 1957, Serial No. 637,844

5 Claims. (Cl. 53—167)

This invention relates to the division of molded pulp "filler flats" employed for holding eggs in the packing thereof in superposed layers within wholesale boxes, and also for holding dozens and half dozens of eggs in retail cartons. The apparatus particularly relates to feeding and severing filler flats holding the usual two and one-half dozen eggs into sections for retail cartons, and in the present embodiment forming two one-dozen filled units and a third unit of a half dozen.

The invention will be described with reference to the accompanying drawings, in which—

Fig. 1 is a view in side elevation, partly broken away and partly in dotted lines, showing an embodiment of the invention.

Fig. 2 is a view in plan of the structure shown in Fig. 1, two filler flats being indicated by dotted lines.

Fig. 3 is a fragmentary end view, somewhat schematic, showing the drive for the cutter disks.

Fig. 4 is an enlarged elevation taken on the line 4—4, Fig. 1.

Fig. 5 is a fragmentary plan view, enlarged, showing the egg-row separation blade and the mounting therefor, the latter being adjustable.

Referring to the drawing, the embodiment shown consists of a base frame or support 1, for a table 2 over which runs an endless belt 3, carried by pulleys 4. The lower length of belt 4 rides over idlers 5, which give it support, and on shaft 6 for the right-hand pulley is a drive member 7, the drive being effected by a chain or belt 8 leading to a drive member 9 on the shaft 10 of a gear-reduction member 11 driven by motor 12.

At an intermediate position relatively to table 2 is a frame 13 which supports a motor 14 which drives a shaft 15 journaled within frame 13, which is hollow. On shaft 15 is a gear 16 which drives a larger gear 17 on a shaft 18, the latter shaft being supported within hollow frame 13, and also by a supporting arm 19 carried by a supporting shaft 20x, Fig. 3.

On shaft 18 are plurality of cutter disks 20. In the embodiment shown these disks are separated on shaft 18, the required distances, by spacer sleeves 21.

On the top of table 2 forwardly of the cutter disks and at the sides of the feed belt 3 are guide rails 22, and carried by table 2 and rising over the guide rails are two carrier bars 23, best shown in Fig. 5. As shown in the latter figure each bar is slotted to receive a set-screw 24 which adjustably carries a plate 25 to which is secured a wavy or zig-zag strip 26. In the present embodiment each bar 23 is formed with two slots, at 27 Fig. 5, and there are two strips 26 which are adjustable toward and from each other. These strips will be hereinafter termed egg-row aligning strips.

Rearwardly of the cutter disks and on table 2 are position curved guide rails 28, there being two sets, for directing selvage trim from the filler flats outwardly and off the table. Also rearwardly of the cutter disks may be positioned guides for the cut sections of the filler flats as indicated at 29, Fig. 2.

Inasmuch as the filler flats, indicated at 30, contain eggs 31 at the time they are cut into sections a problem arises due to the fact that while the eggs are usually graded as to size in the handling and in the positioning of the eggs they do not always lie perfectly upright, but in the several rows some will be inclined relatively to the pockets which hold them, with their side walls in the path of the cutter disks. To overcome this problem, I have provided the egg-row aligning strips 26, each of these strips being in line with an appropriate cutter disk so as to insure that the rows of eggs at the opposite sides of the lines of cut will be moved, as to any irregularities in position and therefore properly aligned.

In the operation of the apparatus, the filled filler flats are successively deposited upon the feed belt 3 and may be guided forwardly by the guide rails 22. In practice these guide rails will be adjustable toward and from each other. In Fig. 2 they are shown, for convenience of illustration, more widely separated relatively to the initial filler flats 30 than required. As the filler flats, with their contained eggs, move forwardly, the rows of eggs intermediate lines of cut are properly positioned by the aligning strips 26 and immediately the filled filler flats are severed into sections for retail cartons. The selvage passes off through the curved guides 28 and the filled sections are passed to a receiving station.

The small particles and dust produced by the cutting of the molded pulp filler flats are drawn away from the cutting area by suction. For this purpose a hood is provided for the cutter assembly, as indicated at 32 Figs. 1 and 2. This hood is perforated to receive a suction pipe 33 leading to a suitable air-suction member (not shown).

Having described my invention, what I claim and desire to secure by Letters Patent, is as follows:

1. In apparatus for dividing filled filler flats for eggs, a frame, a table carried by the frame, means associated with the table for carrying and imparting movement to a succession of filled filler flats, a driven shaft overlying the table, a plurality of cutters operated by and in spaced relation to the shaft, and means in advance of the cutters for aligning eggs in rows of eggs held by the filler flats.

2. In apparatus for dividing filled filler flats for eggs, a frame, a table carried by the frame, means associated with the table for carrying and imparting movement to a succession of filled filler flats, a driven shaft overlying the table, a plurality of cutters operated by and in spaced relation to the shaft, and means in advance of the cutters and consisting of blade-like strips adapted to engage eggs in rows of eggs held by the filler flats.

3. In apparatus for dividing filled filler flats for eggs, a frame, a table carried by the frame, means associated with the table for carrying and imparting movement to a succession of filled filler flats, a driven shaft overlying the table, a plurality of cutters operated by and in spaced relation to the shaft, and strips having irregular side faces adapted to engage eggs in rows of eggs held by the filler flats.

4. In apparatus for dividing filled filler flats for eggs, a frame, a table carried by the frame, means associated with the table for carrying and imparting movement to a succession of filled filler flats, a driven shaft overlying the table, a plurality of cutters operated by and in spaced relation to the shaft, and adapted to sever both selvage and intermediate sections from the filler flats, guide means for directing discharge of the selvage from the table, a plurality of egg engaging members in advance of the cutters for aligning eggs in rows of eggs held by the filler flats, and means for adjusting said egg-engaging members toward and from each other.

5. In apparatus for dividing filled filler flats for eggs, a frame, a table carried by the frame, an endless belt having a length movable on the table, means for moving the belt, a shaft overlying the table at an intermediate area thereof, a plurality of spaced cutter disks on the shaft, a hood overlying the disks, a suction means connected to the hood, and means in advance of the cutter disks for aligning eggs in rows of eggs carried by the filler flats and consisting of irregular faced strips, as and for the purpose described.

No references cited.